US010795928B2

(12) United States Patent
Matsubara et al.

(10) Patent No.: US 10,795,928 B2
(45) Date of Patent: Oct. 6, 2020

(54) IMAGE SEARCH APPARATUS, SYSTEM, AND METHOD

(71) Applicant: Hitachi, Ltd., Chiyoda-ku, Tokyo (JP)

(72) Inventors: Daisuke Matsubara, Tokyo (JP); Kenichi Yoneji, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 427 days.

(21) Appl. No.: 15/564,649

(22) PCT Filed: Apr. 8, 2015

(86) PCT No.: PCT/JP2015/060906
§ 371 (c)(1),
(2) Date: Oct. 5, 2017

(87) PCT Pub. No.: WO2016/162963
PCT Pub. Date: Oct. 13, 2016

(65) Prior Publication Data
US 2018/0081908 A1  Mar. 22, 2018

(51) Int. Cl.
G06F 17/30 (2006.01)
G06F 16/583 (2019.01)
(Continued)

(52) U.S. Cl.
CPC .......... G06F 16/5854 (2019.01); G06K 9/46 (2013.01); G06T 7/248 (2017.01); G06T 7/74 (2017.01);
(Continued)

(58) Field of Classification Search
None
See application file for complete search history.

(56) References Cited

U.S. PATENT DOCUMENTS 8,352,465 B1 * 1/2013 Jing ................ G06F 16/54
707/723
8,811,673 B1  8/2014 Fleites et al.
(Continued)

FOREIGN PATENT DOCUMENTS

CN  102110228 A  6/2011
CN  102843547 A  12/2012
(Continued)

OTHER PUBLICATIONS

International Search Report (PCT/ISA/210) issued in PCT Application No. PCT/JP2015/060906 dated Jul. 14, 2015 with English translation (5 pages).
(Continued)

Primary Examiner — Hung D Le
(74) Attorney, Agent, or Firm — Crowell & Moring LLP

(57) ABSTRACT

An image search apparatus including: an accumulation unit that accumulates search target images; an area detector that learns search priority by analyzing first information extracted from a plurality of first areas included in a plurality of the search target images, analyzes second information extracted from a plurality of second areas included in a query image, and detects the second areas, the search priority of which is high, as conspicuous areas by using the second information; and an image search unit that searches for the search target images by using an image feature extracted from the conspicuous areas.

8 Claims, 11 Drawing Sheets

(51) Int. Cl.
*G06T 7/73* (2017.01)
*G06T 7/246* (2017.01)
*G06K 9/46* (2006.01)

(52) U.S. Cl.
CPC ........... *G06T 2207/10016* (2013.01); *G06T 2207/30196* (2013.01); *G06T 2207/30232* (2013.01)

(56) References Cited

U.S. PATENT DOCUMENTS

| | | | |
|---|---|---|---|
| 8,990,201 B1* | 3/2015 | Johnston | G06F 16/3322 |
| | | | 707/736 |
| 2002/0131641 A1 | 9/2002 | Luo et al. | |
| 2008/0123968 A1* | 5/2008 | Nevatia | G06K 9/00369 |
| | | | 382/228 |
| 2010/0185615 A1* | 7/2010 | Monga | G06F 16/583 |
| | | | 707/736 |
| 2011/0194731 A1 | 8/2011 | BenHimane et al. | |
| 2011/0225172 A1 | 9/2011 | Liu et al. | |
| 2012/0123976 A1* | 5/2012 | Wang | G06K 9/6259 |
| | | | 706/12 |
| 2013/0336529 A1* | 12/2013 | Itani | G06F 16/5838 |
| | | | 382/103 |
| 2014/0168431 A1* | 6/2014 | Goto | G06K 9/00369 |
| | | | 348/143 |
| 2015/0112970 A1* | 4/2015 | Hirai | G06T 7/70 |
| | | | 707/722 |
| 2015/0169645 A1* | 6/2015 | Li | G06F 16/532 |
| | | | 707/722 |
| 2016/0012280 A1 | 1/2016 | Ito et al. | |
| 2016/0196350 A1* | 7/2016 | Mau | G06F 16/951 |
| | | | 707/706 |
| 2016/0344314 A1* | 11/2016 | Akimatsu | H02P 29/50 |
| 2017/0300757 A1* | 10/2017 | Wolf | G06K 9/00771 |

FOREIGN PATENT DOCUMENTS

| | | |
|---|---|---|
| CN | 103838724 A | 6/2014 |
| JP | 2008-242965 A | 10/2008 |
| JP | 2008-262581 A | 10/2008 |
| JP | 2011-39778 A | 2/2011 |
| JP | 2011-192273 A | 9/2011 |
| JP | 2013-225180 A | 10/2013 |
| WO | WO 2014/132841 A1 | 9/2014 |

OTHER PUBLICATIONS

Japanese-language Written Opinion (PCT/ISA/237) issued in PCT Application No. PCT/JP2015/060906 dated Jul. 14, 2015 (4 pages).
Chinese-language Office Action issued in Chinese Application No. 201580078322.0 dated Mar. 4, 2020 with English translation (14 pages).

* cited by examiner

FIG.3

| Frame ID | Camera ID | Photographing Time | Image Data |
|---|---|---|---|
| 1 | 1 | 2014/11/28 10:23:56.000 | |
| 2 | 1 | 2014/11/28 10:23:56.100 | |
| 3 | 1 | 2014/11/28 10:23:56.200 | |
| ... | ... | ... | ... |

| Moving Object ID | Tracking ID | Frame ID | Rectangular Coordinates |
|---|---|---|---|
| 1 | 1 | 1 | [150,310,230,470] |
| 2 | 1 | 2 | [190,300,270,460] |
| 3 | 1 | 3 | [250,290,330,450] |
| ... | ... | ... | ... |

| Tracking ID | Moving Object ID |
|---|---|
| 1 | [1,2,3,4,5,6,...] |
| 2 | [158,159,160,...] |
| 3 | [232,233,234,...] |
| ... | ... |

| Patch ID | Frame ID | Rectangular Coordinates | Patch Feature Quantity |
|---|---|---|---|
| 1 | 1 | [126, 15, 137, 24] | [0.128, 0.92, 0.144, 0.236, 0.49,...] |
| 2 | 1 | [16, 325, 26, 335] | [0.59, 0.213, 0.36, 0.567, 0.19,...] |
| 3 | 2 | [326, 2, 334, 12] | [0.43, 0.21, 0.362, 0.35, 0.644,...] |
| ... | ... | ... | ... |

FIG.4

| Priority Information ID | Priority Information |
|---|---|
| 1 | [0.128, 0.92, 0.144, 0.236, 0.49,...] |
| 2 | [0.59, 0.213, 0.36, 0.567, 0.19,...] |
| 3 | [0.43, 0.21, 0.362, 0.35, 0.644,...] |
| ... | ... |

| Person ID | Person Name | Authentication Time | Tracking ID |
|---|---|---|---|
| 1 | XXXX | 2014/11/28 10:23:56.000 | 1 |
| 2 | YYYY | 2014/11/28 10:23:56.100 | 2 |
| 3 | ZZZZ | 2014/11/28 10:23:56.200 | 3 |
| ... | ... | | ... |

IMAGE SEARCH APPARATUS, SYSTEM, AND METHOD

TECHNICAL FIELD

The present invention relates to an image search system and method. Particularly, the invention relates to information search on computers.

BACKGROUND ART

In recent years along with an increase of heinous crimes and raised security awareness, many surveillance cameras have been being installed at places such as stores, airports, and roads where people gather. Videos recorded by these surveillance cameras are stored in accumulation devices such as monitoring recorders and browsed as necessary. Furthermore, the widespread use of IP cameras has made it possible to connect a large number of cameras via a network; and as a greater storage capacity of the accumulation devices has been realized, an enormous number of videos has been being accumulated. Therefore, it has become very difficult to visually check the entire video data in a conventional way.

So, various similarity-based image search techniques are proposed in order to search for, and present, scenes with specific person(s) and/or object(s) from among a large amount of video data. The similarity-based image search techniques herein used mean techniques to search object data for data similar to a search query designated by a user and present the result. Particularly, a similarity-based image search technique is to search for data with high similarity by using the image features such as colors, shapes, and compositions extracted from images themselves.

For example, when searching for a person, the search may be conducted by using color information of the person's clothes as an image feature. Regarding units for extracting the image feature, possible methods include, for example, extracting the image feature of the person's entire body, dividing the person's body into an upper body and a lower body and extracting their image feature, cutting out shoes and bags in detail and then extracting the image feature, and dividing the person in grids and then extracting the image feature from each area. Whichever extraction unit is used, it is important for enhancement of search accuracy to extract the image feature from areas which are effective for searching for the person.

PTL 1 discloses a technique that determines a rectangular area including a subject based on a conspicuity map for visualizing an area to which a visual attention is drawn with respect to an object area(s) in a target image, in consideration of colors, brightness, and directions from the target image and extracts the image feature from the rectangular area.

CITATION LIST

Patent Literature

PTL 1: Japanese Patent Application Laid-Open (Kokai) Publication No. 2013-225180

SUMMARY OF THE INVENTION

Problems to be Solved by the Invention

When a moving object(s) represented by, for example, a person(s) is to be searched for, it is important to extract the image feature from effective areas for the search. For example, let us assume that a person search is to be performed from videos recorded by surveillance cameras installed at locations where many groups of people wearing read clothes exist. Under this circumstance, even if the search is performed by extracting the image feature from the red clothes, persons wearing the clothes of the same color would be found by the search and the target person cannot be found. Therefore, it is necessary to search areas with image features of low appearance frequency such as shoes and bags other than the red clothes and extract the image features from such areas.

PTL 1 evaluates the effectiveness of the image feature by using only images which are targets for extracting the image feature. In this case, the effectiveness of the image feature is not evaluated in consideration of the above-mentioned relationship with other people and, therefore, this results in the problem of incapability of performing a proper search. Specifically speaking, when the red color is conspicuous in the target images for extracting the image feature, the image feature of the red color will be extracted. So, when a large number of persons wearing red clothes exist in a database, only the persons wearing the red clothes will be searched and other features cannot be utilized effectively.

Means to Solve the Problems

For example, the configurations described in claims are adopted in order to solve the above-described problems. The present application includes a plurality of means to solve the above-described problems and one example of the plurality of means is an image search apparatus including: an accumulation unit that accumulates search target images; an area detector that learns search priority by analyzing first information extracted from a plurality of first areas included in a plurality of the search target images, analyzes second information extracted from a plurality of second areas included in a query image, and detects the second areas, the search priority of which is high, as conspicuous areas by using the second information; and an image search unit that searches for the search target images by using an image feature extracted from the conspicuous areas.

An alternative example is an image search method including: a first step of accumulating search target images in an accumulation unit; a second step of learning search priority by analyzing first information extracted from a plurality of first areas included in a plurality of the search target images, analyzing second information extracted from a plurality of second areas included in a query image, and detecting the second areas, the search priority of which is high, as conspicuous areas by using the second information; and a third step of searching for the search target images by using an image image feature extracted from the conspicuous areas.

Advantageous Effects of the Invention

According to an embodiment of the present invention, the search accuracy can be enhanced by detecting conspicuous areas, which are appropriate for the search, in a query image by comparison with search target images.

BRIEF DESCRIPTION OF DRAWINGS

FIG. 3 is an explanatory diagram illustrating image feature management information according to the first embodiment;

FIG. 4 is an explanatory diagram illustrating priority information according to the first embodiment;

DESCRIPTION OF EMBODIMENTS

Embodiments of the present invention will be explained with reference to the drawings.

Embodiment 1

An image search system according to a first embodiment of the present invention will be explained with reference to the drawings.

Figure 1:
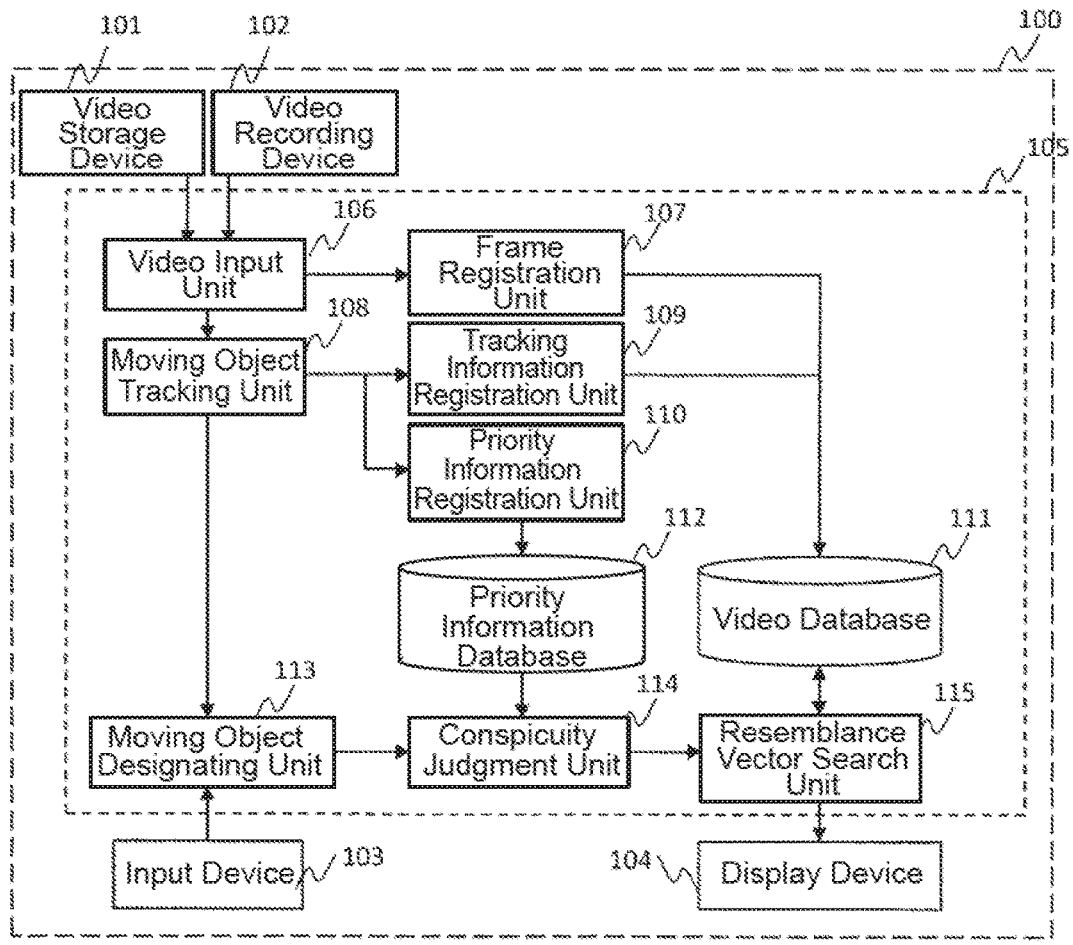
FIG. 1 is a block diagram illustrating the configuration of an image search system according to a first embodiment.

FIG. 1 is an overall configuration diagram of an image search system 100 according to Embodiment 1 of the present invention.

The image search system 100 according to this embodiment includes a video storage device 101, a video recording device 102, an input device 103, a display device 104, and a server computer 105. The video storage device 101: is storage media that store video data and output them in response to requests; and can be configured by using hard disk drives built in a computer or storage systems connected via a network such as a NAS (Network Attached Storage) or a SAN (Storage Area Network).

The video recording device 102 is a device that records videos to create video data and outputs them.

Any images output from the video storage device 101 or the video recording device 102 are input to a video input unit 106 (described later) for the server computer 105. The image search system 100 may include both the video storage device 101 and the video recording device 102 as illustrated in FIG. 1, but may include only either one of them. When the image search system 100 includes both the video storage device 101 and the video recording device 102, the input source of the video data to the video input unit 106 may be switched to the video storage device 101 or the video recording device 102 as necessary; and the video data which are output from the video recording device 102 may be stored in the video storage device 101 once and then input to the video input unit 106. In this case, the video storage device 101 may be, for example, a cache memory that temporarily stores the video data which are continuously input from the video recording device 102.

Incidentally, the video data stored in the video storage device 101 and the video data created by the video recording device 102 may be data of any format as long as they can be used to track a video-recorded moving object(s). For example, the video recording device 102 may be a video camera and moving image data which are video-recorded by the video camera may be output as video data or such video data may be stored in the video storage device 101. Alternatively, the video recording device 102 may be a still camera and a series of still image data photographed by the still camera at specified intervals (at least at some intervals to enable tracking of photographed objects) may be output as video data and such video data may be stored in the video storage device 101.

The input device 103 is an input interface such as a mouse, a keyboard, and a touch device for transmitting the user's operations to the server computer 105. The display device 104 is an output interface such as a liquid display and is used to, for example, display search results by the server computer 105 and perform interactive operations with the user. For example, the input device 103 and the display device 104 may be integrated with each other by using a so-called touch panel or the like.

The server computer 105 functions as an image search apparatus for searching input video data for a desired image under search conditions designated by the user. Specifically speaking, the server computer 105 tracks a moving object(s) included in each frame of the given video data and accumulates information regarding the moving object(s). When the user designates search conditions to search for a moving object(s) from the accumulated frames, the server computer 105 searches images by using the accumulated information. Videos handled by the server computer 105 are assumed to be videos of fixed-point observation video-recorded at one or more locations. Furthermore, a search target object is an arbitrary moving object such as a person or a vehicle. The server computer 105 includes a video input unit 106, a frame registration unit 107, a moving object tracking unit 108, a tracking information registration unit 109, a priority information registration unit 110, a video database 111, a priority information database 112, a moving object designating unit 113, a conspicuity judgment unit 114, and a simlarvector search unit 115.

The video input unit 106 reads video data from the video storage device 101 or receives video data video-recorded by the video recording device 102 and then converts them to a data format to be used within the server computer 105. Specifically speaking, the video input unit 106 execute moving image decoding processing for breaking down videos (in a moving image data format) into frames (in a still image data format). The obtained frames are transmitted to the frame registration unit 107 and the moving object tracking unit 108. Incidentally, when frames, but not videos, can be obtained from the video storage device 101 or the video recording device 102, the obtained frames may be used.

The frame registration unit 107 writes the extracted frames and information regarding the videos, which are extraction sources, to the video database 111. The details of data recorded in the video database 111 will be explained later as an explanation regarding FIG. 3.

The moving object tracking unit 108 detects a moving object(s) in the videos and tracks the moving object(s) by associating it with the moving object in an immediately preceding frame. Detection and tracking of the moving object(s) can be implemented by an arbitrary method. Trajectory information is composed of coordinate information of the relevant moving object in each frame and an ID uniquely assigned to each trajectory (tracking ID).

The tracking information registration unit 109 registers the assigned tracking ID in the video database 111.

The priority information registration unit 110 calculates priority information from the moving object obtained from the moving object tracking unit 108 and registers it in the priority information database 112. The details of the priority information will be explained later as explanations regarding FIGS. 4, 5 and 6.

The video database 111 is a database for storing, for example, the videos, the frames and the trajectory information of moving objects. Accesses to the video database 111 occur during registration processing from the frame registration unit 107 and the tracking information registration unit 109 and search processing from the similar vector search unit 115. The structure of the video database 111 will be described later in detail as the explanation regarding FIG. 3.

The priority information database 112 is a database for storing the priority information to perform conspicuity judgment. Accesses to the priority information database 112 occur during registration processing from the priority information registration unit 110 and judgment processing from the conspicuity judgment unit 114. The structure of the priority database 112 will be described later in detail as an explanation regarding FIG. 4.

The moving object designating unit 113 receives a moving object (for example, a bounding rectangle of a person) designated by the user from the input device 103.

The conspicuity judgment unit 114 extracts an image feature for the conspicuity judgment from the input moving object and determines conspicuous areas in the moving object by using the priority information stored in the priority information database 112. The details will be described as an explanation regarding FIG. 9.

The similar vector search unit 115 searches the video database 111 for the image feature which is similar to a search image feature extracted from partial areas of the moving object, which are judged as conspicuous areas, and outputs the results to the display device 104.

Figure 2:
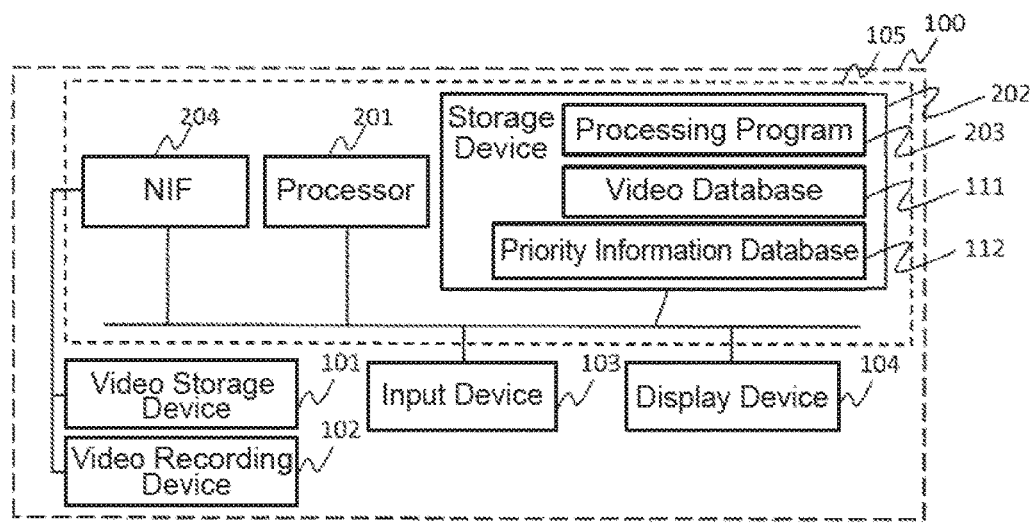
FIG. 2 is a configuration diagram illustrating a hardware configuration of the first embodiment.

FIG. 2 is a hardware configuration diagram of the image search system 100 according to Embodiment 1 of the present invention. The server computer 105 is, for example, a general computer having a processor 201 and a storage device 202 which are connected to each other. The storage device 202 is composed of arbitrary kinds of storage media. For example, the storage device 202 may include semiconductor memories and hard disk drives.

In this example, functional units illustrated in FIG. 1 that are the video input unit 106, the frame registration unit 107, the moving object tracking unit 108, the tracking information registration unit 109, the priority information registration unit 110, the video database 111, the priority information database 112, the moving object designating unit 113, the conspicuity judgment unit 114, and the similar vector search unit 115 are implemented by the processor 201 executing a processing program 203 stored in the storage device 202. In other words, processing executed by each functional unit mentioned above in this example is in fact executed by the processor 201 which follows orders described in the processing program 203. Furthermore, the video database 111 and the priority information database 112 are included in the storage device 202.

The server computer 105 further includes a network interface device (NIF) 204 connected to the processor. The video recording device 102 is, for example, connected to the server computer 105 via the network interface device 204. The video storage device 101 may be a NAS or a SAN connected to the server computer 105 via the network interface device 204 or may be included in the storage device 202.

Incidentally, the image search system according to this embodiment is configured so that a general personal computer provides services by means of an image search application and that the server computer 110 and a client computer 130 which are connected via the network provide services; however, the image search system according to this embodiment may be configured so that a general personal computer provides services by means of an image search application.

FIG. 3 is an explanatory diagram of the structure and data examples of the video database 111 according to Embodiment 1 of the present invention. A structure example of a table format is illustrated here, but the data format may be arbitrary.

The video database 111 includes image data management information 300, moving object management information 310, tracking information management information 320, and patch image feature management information 330 as illustrated in FIG. 3. Table structures of FIG. 3 and the field structure of each table are necessary structures to implement the present invention and a table(s) and a field(s) may be added depending on the relevant application(s).

The image data management information 300 includes a frame ID field 301, a camera ID field 302, a photographing time field 303, and an image data field 304.

The frame ID field 301 retains identification information of frame image data extracted from the video data (hereinafter referred to as the frame ID).

The camera ID field 302 retains identification information of the video recording device 102 (hereinafter referred to as the camera ID). When the video data are read from the video storage device 101, the camera ID may be omitted or identification information of a video file (hereinafter referred to as the video ID) may be retained.

The photographing time field 303 retains information regarding time when the relevant image was photographed.

The image data field 304 retains data which is binary data of a still image of the relevant frame and is used when displaying, for example, the search result on the display device 104.

The moving object management information 310 includes a moving object ID field 311, a tracking ID field 312, a frame ID field 313, and a rectangular coordinates field 314.

The moving object ID field 311 retains a list of identification information of the moving object(s) detected in each frame (hereinafter referred to as the moving object ID). The moving object ID herein used does not identify the relevant moving object itself, but identifies an image of the moving object(s) detected from each frame. When images of the same moving object are detected from a plurality of frames, different (unique) moving object IDs are assigned to these respective images of the moving object and each moving object ID is associated with one tracking ID.

The tracking ID field 312 retains the tracking ID linked to the above-described moving object ID.

The frame ID field 313 retains the frame ID of a frame image based on which each moving object is detected. This frame ID corresponds to information retained in the frame ID field 301 of the image data management information 300.

The rectangular coordinates field 314 retains rectangular coordinates indicating the range occupied by an image of the moving object, which is detected from each frame, in the relevant frame image. These coordinates may be expressed in a format of, for example, "horizontal coordinates of an upper left corner, vertical coordinates of the upper left corner, horizontal coordinates of a lower right corner, and vertical coordinates of the lower right corner" of a bounding rectangle of the moving object or may be expressed with the coordinates of the center of the rectangle, its width, and height. Rectangular coordinates retained in the rectangular coordinates field 333 described later may be expressed in the same manner.

The tracking information management information 320 includes a tracking ID field 321 and a moving object ID list 322.

The tracking ID field 321 corresponds to information retained in the tracking ID field 312 of the moving object management information 310.

The moving object ID field 322 retains a list of moving object IDs to which the same tracking ID is assigned. The moving object ID field 322 corresponds to information retained in the moving object ID field 311 of the moving object management information 310.

For example, the fact that "1, 2, 3, 4, 5, 6 . . . " are registered in the moving object ID field 8322 corresponding to the tracking ID "1" as illustrated in FIG. 3 means that an image of a moving object identified by the moving object ID "1" detected from a certain frame, an image of a moving object identified by the moving object ID "2" detected from another frame, and images of moving objects identified by the moving object IDs "4", "5", and "6" similarly detected from respectively different frames are associated with each other by the moving object tracking unit 108 (that is, it is judged that they are the images of the same moving object). An example of a method for tracking the moving object is to: extract an image feature from each of the image of the moving object ID "1" detected from the certain frame and the image of the moving object ID "2" detected from the other frame; calculates the similarities(distance) between the image features; judge that the moving objects of these images are the same moving object if the similarity is equal to or more than a threshold value; and associate them with each other.

The patch image feature management information 330 includes a patch ID field 331, a frame ID field 332, a rectangular coordinates field 333, and a patch image feature field 334. The patch ID field 331 retains identification information of a partial area of the moving object tracked from the frame image by the moving object tracking unit 108 (hereinafter referred to as the patch ID). Each block area obtained by dividing the bounding rectangle of the moving object into grids may be used as the partial area; or parts such as a bag or an upper body may be used as the partial areas.

The frame ID field 332 retains the frame ID of a frame in which the moving object including the partial area of the patch is detected. This frame ID corresponds to information retained in the frame ID field 301 of the image data management information 300.

The rectangular coordinates field 333 retains coordinates indicating the range occupied by the detected patch area in the frame image.

The patch image feature field 334 retains the image feature extracted from the detected clothing area.

FIG. 4 is an explanatory diagram of the structure and data examples of the priority information database 112 according to Embodiment 1 of the present invention. A structure example of a table format is indicated here, but the data format may be arbitrary.

The priority information database 112 includes priority information 400. The priority information 400 stores a priority information ID 401 and priority information 402. The priority information ID 401 is an ID for identifying each piece of the priority information. The priority information 402 is information for calculating the image feature with low appearance frequency in the patch image feature field 334 retained by the patch image feature management information 330 in the video database 111. An image feature vector of the image feature with the low appearance frequency may be stored as it is; or a set of basic vectors may be calculated from the image features stored in the patch image feature field 334 and vector data which represents the image features stored in the patch image feature field 334 with components of the basic vectors may be stored. Furthermore, the priority information may be stored for the foreground and the background separately or may be stored for each video recording device. When the priority information is stored for the foreground and the background separately, they can be searched parallelly and the search speed can be enhanced. The same applies when the priority information is stored for each video recording device. On the other hand, when the priority information is stored without dividing it into the foreground and the background, the required disk capacity for storage can be reduced and the accessibility can be enhanced.

The table structure of FIG. 4 and the field structure of each table are necessary structures to implement the present invention and a table(s) and a field(s) may be added depending on the relevant application(s).

Figure 5:
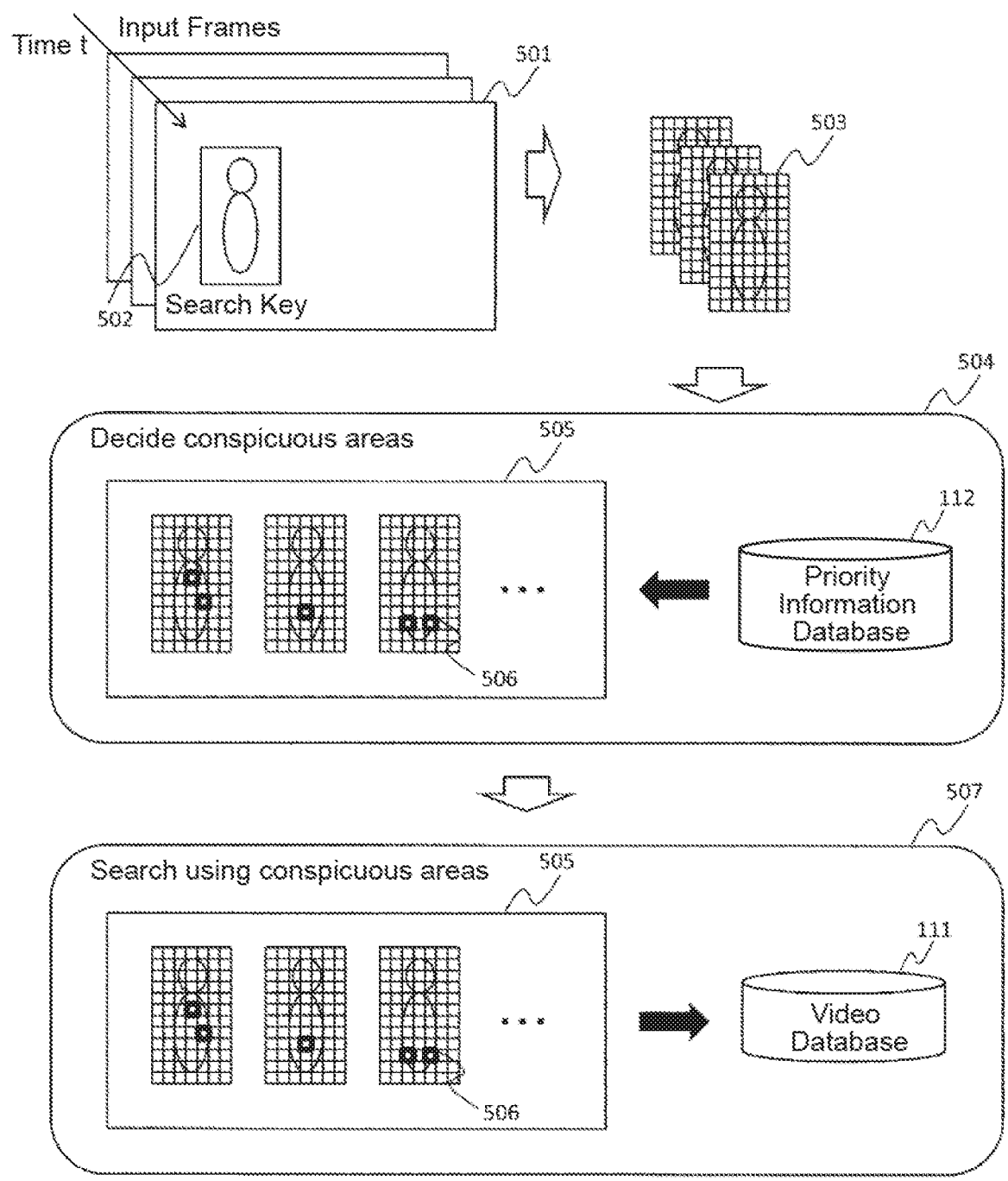
FIG. 5 is an explanatory diagram illustrating a moving object search method using the priority information according to the first embodiment.

FIG. 5 is an explanatory diagram for searching for a moving object for which the priority information according to Embodiment 1 of the present invention is used.

Frame images 501 are obtained from the video data input from the video input unit 106 and the obtained frame images 501 are displayed on the display device 104. When this happens, the user designates a moving object 502, as a search key, in the frame images 501 by using the input device 103.

Next, the moving object 502 is divided into grids, thereby obtaining grid images 503. In this embodiment, the moving object 502 is divided into the grids as illustrated in FIG. 5 for the easiness of the processing and reduction of burdens; however, as other methods for dividing the moving object 502, parts such as a bag and an upper body may be obtained as units by dividing the moving object 502 or parts with many edge information may be cut out.

Conspicuous area determination processing (504) determines whether each partial area of the grid images 503 is a conspicuous area 506 or not by using the priority information stored in the priority information database 112. A priority information calculation will be explained later with reference to FIG. 6 and a conspicuous area judgment method will be explained later with reference to FIG. 7.

Search processing (507) using the conspicuous areas calculates the similarity between an image feature extracted from the conspicuous areas 506 and the patch image feature 334 stored in the video database 111. Regarding a method for calculating the similarity, the Euclidean distance may be used or other methods such as the cosine distance may also be used.

In light of the above, the image search apparatus 105 described in this embodiment is characterized in that it includes: the accumulation unit 111 that accumulates search target images; the area detector 114 that learns the search priority 400 (110) by analyzing the first information extracted for the plurality of first areas included in the plurality of search target images, analyzes the second information extracted from the plurality of second areas included in the query image 502, and detects the second areas with high search priority as the conspicuous areas 506 by using the second information; and the image search unit 115 that searches for the search target images by using the images feature extracted from the conspicuous areas 506.

As areas whose appearance frequency in the search target images is low, among the second areas in the query image, are specified as the search query as described above, it is possible to prevent the phenomenon of a large amount of search noises other than the targeted images appearing in the search results due to generic patterns in the query image, thereby enhancing the search accuracy. Incidentally, in this embodiment, moving images are input and a moving object captured in the moving images is assumed as the search query; however, it is a matter of course that even if a plurality of images which are chronologically irrelevant are input, the advantageous effects of the present invention can be achieved. The advantageous effects of this embodiment are not limited to when searching for the moving object; and even when some object pictured in images is simply set as a query, the search priority can be learned and the search can be performed.

Figure 6:
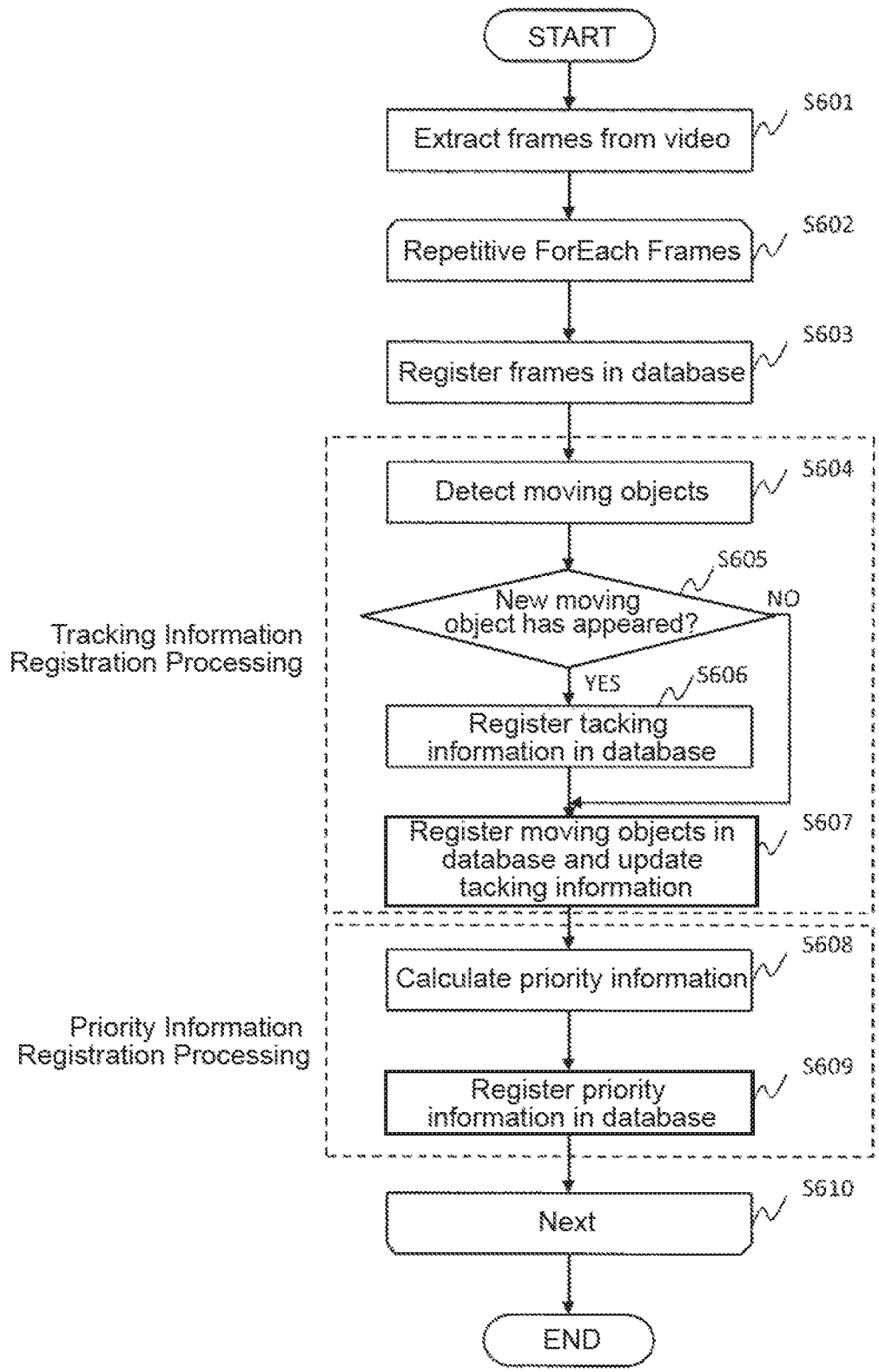
FIG. 6 is a flowchart illustrating video registration processing according to the first embodiment.

FIG. 6 is a flowchart for explaining processing for registering a video which is input by the server computer 105 according to Embodiment 1 of the present invention. Each step of FIG. 6 will be explained.

Firstly, the video input unit 106 decodes video data which is input from the video storage device 101 or the video recording device 102, and extracts frames as still images (step S601). When data which is input from the video storage device 101 or the video recording device 102 is a still image, the still image is used as it is.

Next, each unit in the server computer 105 executes step S602 to S610 on each frame extracted in step S601.

The frame registration unit 107 registers the frame ID 301, the camera ID 302, the photographing time 303, and the image data 304 in the video database 111 (step S603).

Tracking information registration processing will be explained by using step S604 to step S607.

The moving object tracking unit 108: detects the moving object from a frame which is a processing target; and associates the detected moving object with the moving object detected in a frame of previous time (step S604).

Next, the moving object tracking unit 108 determines whether any new moving object has appeared or not (step S605). Specifically speaking, if the moving object tracking unit 108 fails to associate the moving object detected from the processing target frame with any moving object detected from the frame of the previous time (in other words, if it is judged that an image of the same moving object as the moving object detected from the processing target frame is not included in the frame of the previous time), the moving object tracking unit 108 determines that the new moving object has appeared.

When the new moving object has appeared, the moving object tracking unit 108 assigns a new tracking ID to the new moving object and the tracking information registration unit 109 registers the new tracking ID and the moving object ID, respectively, in the tracking ID field 321 and the moving object ID field 322 in the tracking information management information 320 of the video database 111 (step S606). On the other hand, when any new moving object has not appeared, step S606 is not executed.

Next, the tracking information registration unit 109 registers the moving object ID, the tracking ID, the frame ID, and the rectangular coordinates of the moving object detected in the frame image, respectively, in the moving object ID field 311, the tracking ID field 312, the frame ID field 313, and the rectangular coordinates 314 in the moving object management information 310 of the video database 111 (step 607). Furthermore, the ID of the moving object is added to the moving object ID field 322 in the tracking information management information 320 (step S607).

Incidentally, regarding the processing for registering the tracking information and the moving object information, each frame registration processing does not have to be executed and the processing may be executed when the moving object disappears. Specifically speaking, if the moving object tracking unit 108 fails to associate the moving object detected from the frame of the previous time with any moving object detected in step S607 (in other words, if it is judged that an image of the same moving object as the moving object detected from the frame of the previous time is not included in the processing target frame), the moving object tracking unit 108 determines that the moving object detected from the frame of the previous time has disappeared; and the tracking information and the moving object information of the relevant moving object may be registered collectively.

The priority information registration processing will be explained by using step S608 and step S609.

The priority information is calculated by using the image feature for priority calculation which is extracted from partial areas of the moving object (step S608). Edge information and color histogram may be used as the image feature for the priority calculation. Each block area obtained by dividing the moving object in grids may be used as the partial area; or in a case of a human body, areas such as a bag or an upper body may be limited as the partial areas.

The priority information is stored as the priority information 400 in the priority information database 112 (step S609). Incidentally, the priority information may be registered for each frame or periodically or may be registered in advance. Furthermore, the priority information may be stored in each video recording device or at each video recording location. If the priority information is stored in each recording device, the priority information can be switched according to the image quality of the video recording device.

When steps S602 to S610 are completed with respect to all the frames extracted from the video data, the processing for registering the input video terminates.

Figure 7:
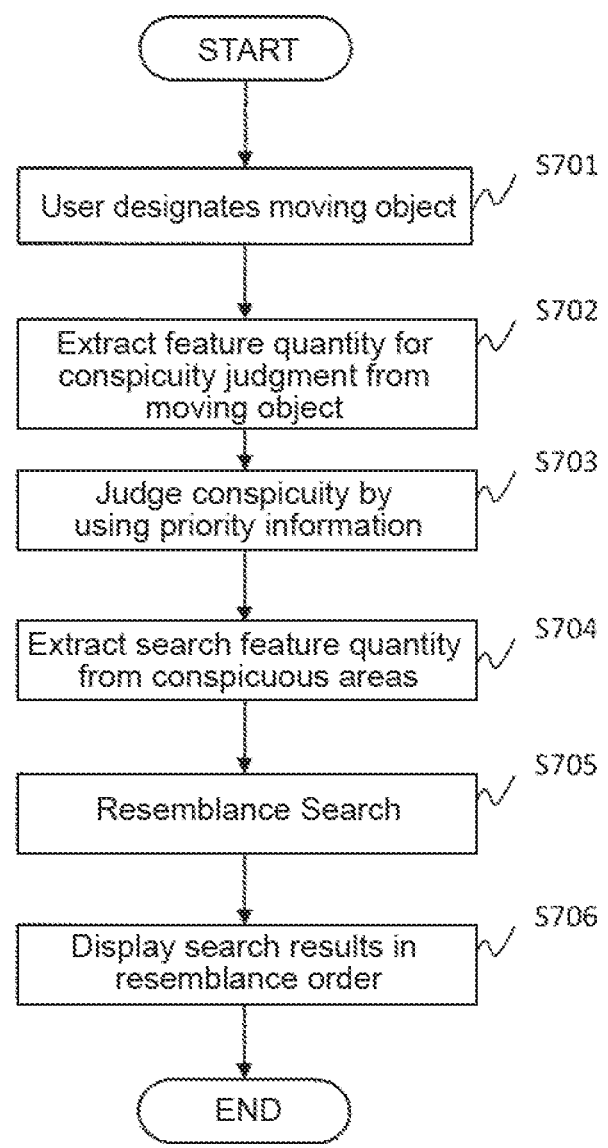
FIG. 7 is a flowchart illustrating priority information calculation processing according to the first embodiment.

FIG. 7 is a flowchart for explaining the processing executed by the server computer 105 according to Embodiment 1 of the present invention for searching for a moving object. Each step of FIG. 8 will be explained below.

Firstly, the user designates a moving object displayed on the display device 104 by using the input device 103 (step S701).

Next, the image feature for the priority calculation is extracted from partial areas of the designated moving object in the same manner as with the image feature extracted in step S608 (step S702). When this happens, the image feature may be extracted for each area obtained by dividing the entire moving object in grids; or in a case of a person, the image feature may be extracted for each area such as a bag or an upper body. Furthermore, the image feature may be extracted from not only the frame images including the designated moving object, but also from moving objects to which the same moving object ID is assigned.

Then, conspicuity of each partial area is judged by using the priority information 400 of the priority information database 112 and the image feature extracted in step S802 (step S703). When the image feature with low appearance frequency is stored in the priority information 400 of the priority information database 112, the conspicuity may be judged to be high if the image feature is similar to such image feature; or other methods may also be used. Furthermore, when the priority information 400 is stored for each video recording device, the priority is calculated by using the priority information for the video recording device which photographed the target images.

Subsequently, the search image feature is extracted from partial areas with high conspicuity (step S704). As a method for deciding the partial areas with high conspicuity, all the partial areas whose conspicuity exceeds a previously designated threshold value may be used, or a partial area with the highest conspicuity in the moving object may be used, or the partial area with the highest conspicuity may be used for each previously designated area. Edge information or color histogram may be used as the search image feature or the same image feature as the image feature for the priority judgment may also be used.

Next, the similarity between the extracted image feature and the patch image feature of the patch image feature field 334 in the patch image feature management information 330 stored in the video database 111 is calculated (step S705). Regarding a method for calculating the similarity, the Euclidean distance may be used or other methods such as the cosine distance may also be used.

Lastly, the search result is displayed by using the patch image feature regarding which the similarity was judged to be high in step S705 (step S706). Under this circumstance, the patch ID 331 may be displayed as the search result, or the moving object ID including the relevant patch may be displayed, or the frame image(s) including the relevant moving object ID may be displayed.

Figure 8:
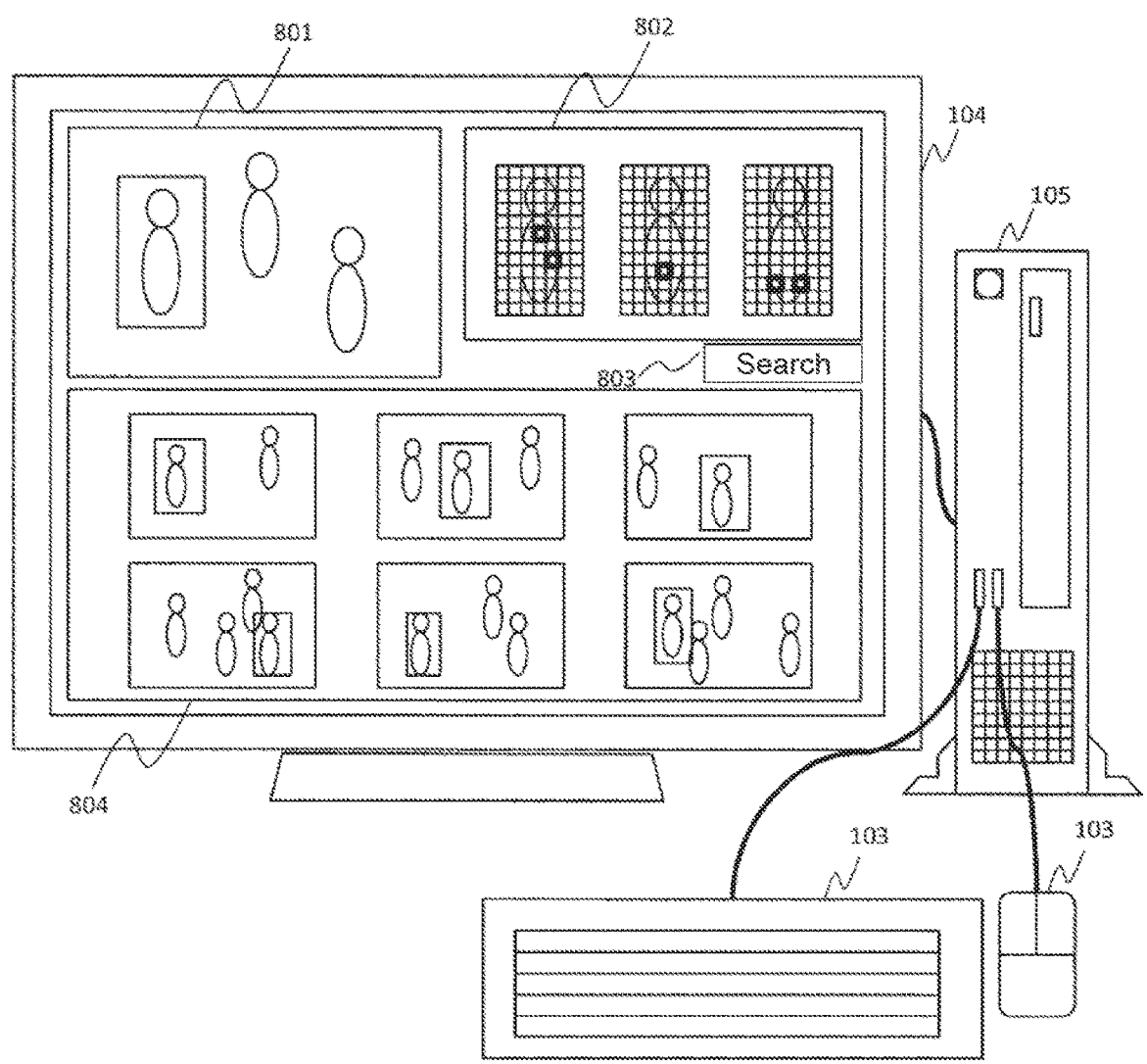
FIG. 8 is a flowchart illustrating moving object search processing according to the first embodiment.

FIG. 8 is an explanatory diagram of a search screen which is output by the server computer 105 according to Embodiment 1 of the present invention. An example of a method for inputting information from the user and a search result display method for the processing in FIG. 7 will be explained with reference to FIG. 8.

The search screen displayed by the display device 104 includes a moving object selection area 801, a conspicuity display area 802, a search button 803, and a search result display area 904.

The moving object selection area 801 displays moving objects and the user designates a moving object which becomes a search key from among them (step S701).

The image feature for conspicuity judgment is extracted from the moving object designated by the user (step S702) and the results of conspicuity judgment by using the priority information (step S703) are displayed in the conspicuity display area 802. For example, the conspicuity of each partial area obtained by dividing the moving object in grids is judged and each partial area with the conspicuity equal to or more than a previously designated threshold value is displayed by framing it in a rectangle. When the conspicuity of a moving object(s) with the same moving object ID as that of the moving object designated by the user is judged, a plurality of moving objects are displayed.

When the user operates the search button 803 by using a mouse or the like, the search image feature is extracted from the conspicuous areas (step S704); the similarity-based image search is executed (step S705); and data with high similarity are displayed in the search result screen 804 (step S706). For example, regarding the search result display method, frame images in which the moving object is captured, including a patch with high similarity, are displayed in descending order of similarity and the moving object is displayed by framing it in a rectangle.

In light of the above, the image search method according to this embodiment is characterized in that it includes: a first step of accumulating search target images in the accumulation unit 111 (S603); a second step of learning the search priority by analyzing the first information extracted from a plurality of first areas included in a plurality of the search target images (S608, 609), analyzing the second information extracted from a plurality of second areas included in a query image (S702), and detecting the second areas whose search priority is high, as conspicuous areas, by using the second information (S703); and a third step of detecting the search target images by using the image feature extracted from the conspicuous areas (S704, 705).

As areas whose appearance frequency in the search target images is low, among the second areas in the query image, are specified as the search query as described above, it is possible to prevent the phenomenon of a large amount of search noises other than the targeted images appearing in the search results due to generic patterns in the query image, thereby enhancing the search accuracy.

Embodiment 2

An image search system according to a second embodiment of the present invention will be explained below with reference to the diagrams.

Next, the image search system 100 according to Embodiment 2 of the present invention will be explained. Except for the differences described below, each unit of the image search system 100 according to Embodiment 2 has the same function as that of each unit, to which the same reference numeral is assigned, of Embodiment 1 illustrated in FIG. 1 to FIG. 8, so that an explanation regarding them has been omitted.

Figure 9:
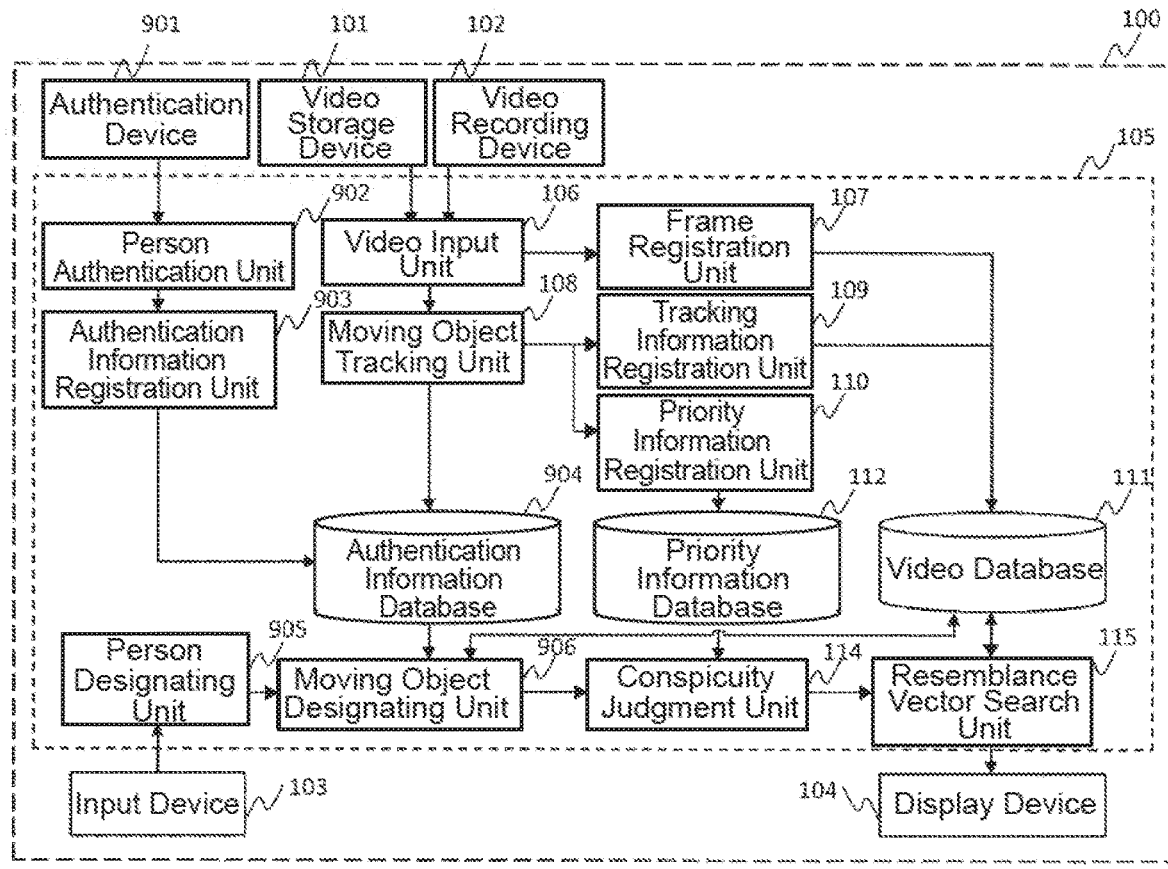
FIG. 9 is an explanatory diagram illustrating a search screen according to the first embodiment.

FIG. 9 is an overall configuration diagram of the image search system 100 according to Embodiment 2 of the present invention. The image search system 100 according to this embodiment includes the video storage device 101, the video recording device 102, the input device 103, the display device 104, the server computer 105, and an authentication device 901. Since the video storage device 101, the video recording device 102, the input device 103, and the display device 104 are the same as those of Embodiment 1, an explanation regarding them has been omitted.

The authentication device 901 is a device for performing person authentication. For example, the authentication device 901 may be a biometric authentication device such as a finger vein authentication device or a facial authentication device, or an ID card authentication device. The authentication device 901 is installed together with the video recording device 102 as a set, but the video recording device 102 may not be equipped with the authentication device 901. Incidentally, a time synchronization module may also be provided in order to synchronize time between the authentication device 901 and the server computer 105. The time synchronization module may be included in the server computer 105.

The server computer 105 of Embodiment 2 includes a person authentication unit 901, an authentication information registration unit 902, an authentication information database 904, a person designating unit 905, and a moving object deciding unit 906 in addition to the video input unit 106, the frame registration unit 107, the moving object tracking unit 108, the tracking information registration unit 109, the priority information registration unit 110, the video database 111, the priority information database 112, the conspicuity judgment unit 114, and the similar vector search unit 115 which are the same as those of Embodiment 1.

Figure 10:
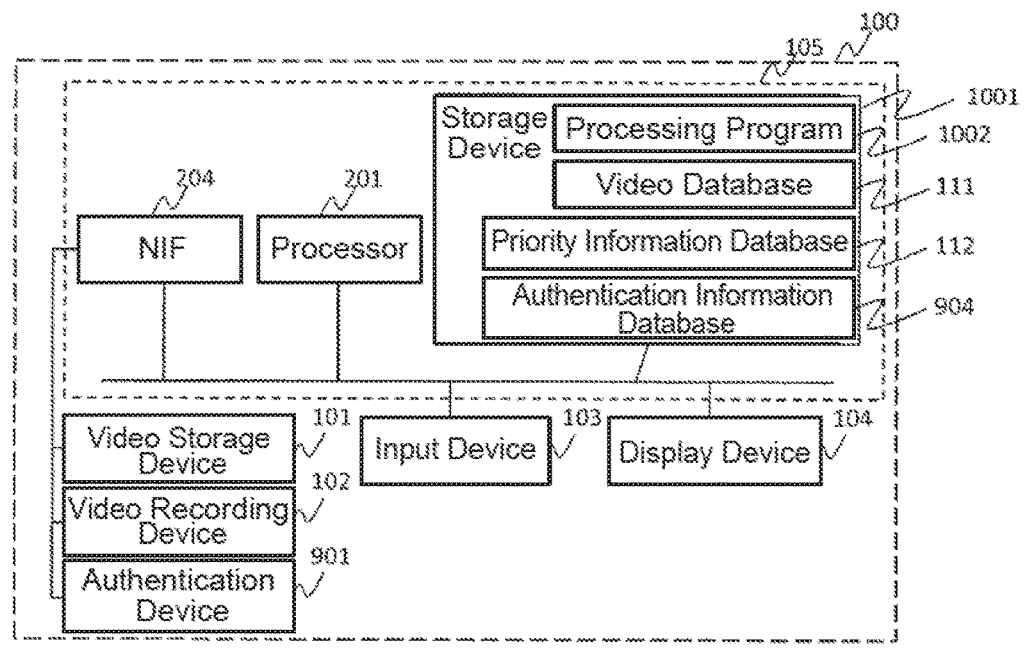
FIG. 10 is a configuration diagram illustrating a hardware configuration according to a second embodiment.

FIG. 10 is a hardware configuration diagram of the image search system 100 according to Embodiment 2 of the present invention.

The processor 201 and the network interface 204 are the same as those of Embodiment 1. The storage device 1001 is composed of arbitrary kinds of storage media. In this example, functional units illustrated in FIG. 9 that are the video input unit 106, the frame registration unit 107, the moving object tracking unit 108, the tracking information registration unit 109, the priority information registration unit 110, the video database 111, the priority information database 112, the conspicuity judgment unit 114, the similar vector search unit 115, the person authentication unit 902, the authentication information registration unit 903, the authentication information database 904, the person designating unit 905, and the moving object deciding unit 906 are implemented by the processor 201 executing a processing program 1002 stored in a storage device 1001.

The authentication device 901 is connected to the server computer 105 via the network interface 204.

Figures 11, 12:
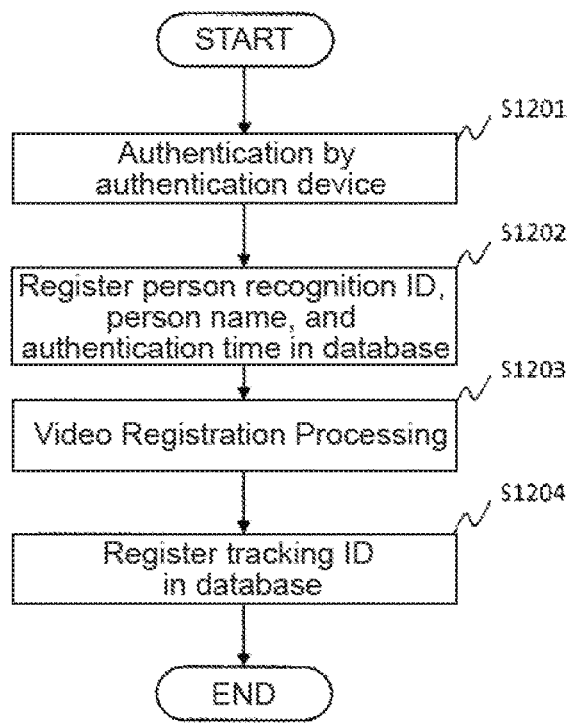
FIG. 11 is an explanatory diagram illustrating information accumulated in an authentication information database according to the second embodiment.
FIG. 12 is a flowchart illustrating authentication processing according to the second embodiment.

FIG. 11 is an explanatory diagram of the structure and data examples of the video database 111 according to Embodiment 2 of the present invention. A structure example of a table format is indicated here, but the data format may be arbitrary.

The authentication information database 904 includes authentication data management information 1100 illustrated in FIG. 11. The table structure of FIG. 11 and the field structure of each table are necessary structures to implement the present invention and a table(s) and a field(s) may be added depending on the relevant application(s).

The authentication data management information 1100 includes a person ID field 1101, a person name field 1102, an authentication time field 1103, and a tracking ID field 1104.

The authentication ID field 1101 retains identification information of a person authenticated by the authentication device 901 (hereinafter referred to as the authentication ID). The person name field 1102 retains the person name of the person authenticated by the authentication device 901. When the person name is not registered in advance, other information which means the person name may be retained or this field does not have to exist.

The authentication time field 1103 retains time when the authentication was performed by the authentication device 901.

The tracking ID 1104 is the same as the tracking ID 312 included in the moving object management information 310 retained in the video database 111. Accesses can be made via the relevant tracking ID to, for example, the frame ID 313, the rectangular coordinates 314, and the image data 304 which are retained in the video database 111.

FIG. 12 is a flowchart for explaining authentication processing executed by the server computer 105 according to Embodiment 2 of the present invention. Each step of FIG. 12 will be explained below. The video recording device 102 equipped with the authentication device 901 executes the authentication processing described here and then executes the video registration processing in accordance with the flowchart explained with reference to FIG. 6. Incidentally, the video registration processing may be executed at the same time as this authentication processing.

Firstly, authentication by the authentication device 901 is performed (step S1201). Biometric authentication such as fingerprint authentication, finger vein authentication, or iris authentication may be used or authentication with an ID card or the like may be performed.

Then, the person identification ID 1100, the person name 1102, and the authentication time 1103 acquired from the authentication device 901 are registered in the authentication information database 904 (step S1202).

Next, the video registration processing is executed in accordance with the flowchart explained with reference to FIG. 6 (step 1203). When a walk-through type authentication device is used, step S1202 and step 1203 may be performed at the same time. Alternatively, step 1203 may be performed to execute the video registration processing before performing the authentication in step S1202.

Lastly, the person ID 1104 obtained in the video registration processing is registered in the authentication database 904.

Figure 13:
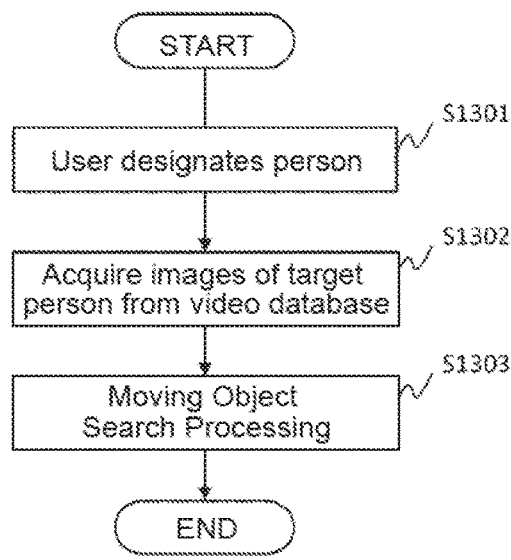
FIG. 13 is a flowchart illustrating search processing according to the second embodiment.

FIG. 13 is a flowchart for explaining processing executed by the server computer 105 according to Embodiment 2 of the present invention to search for a person. Each step of FIG. 13 will be explained below.

Firstly, the user designates a person which becomes a search key with the person designating unit 905 by using the input device 103 (step S1301). When this happens, the user may input the person name, input the person ID, or input time when the person passes through the authentication device.

Next, the moving object deciding unit 906 acquires the video data of the person designated by using input information from the user (step S1302). The moving object deciding unit 906 makes an inquiry to the authentication information database 904 by using the input information and acquires the tracking ID 1104 of the relevant person. Then, the moving object deciding unit 906 makes an inquiry to the video database 111 by using the tracking ID 1104 and acquires the video data of the relevant person.

The search is performed by using the acquired video data in the same manner as in the flowchart of the moving object search explained with reference to FIG. 7 (step S1303). The processing for the user to designate the moving object in step 701 in FIG. 7 is replaced with step S1301 to step S1302 in FIG. 13.

According to Embodiment 2 of the present invention described above, the person name or the person ID can be designated upon the search by causing the authentication device and the image search apparatus cooperate with each other, so that the target person can be searched easily.

Embodiment 3

An image search system according to a third embodiment of the present invention will be explained with reference to the drawings.

Next, the image search system 100 according to Embodiment 3 of the present invention will be explained. Except for the differences described below, each unit of the image search system 100 according to Embodiment 2 has the same function as that of each unit, to which the same reference numeral is assigned, of Embodiment 1 and Embodiment 2 illustrated in FIGS. 1 to 13, so that an explanation regarding them has been omitted.

Figure 14:
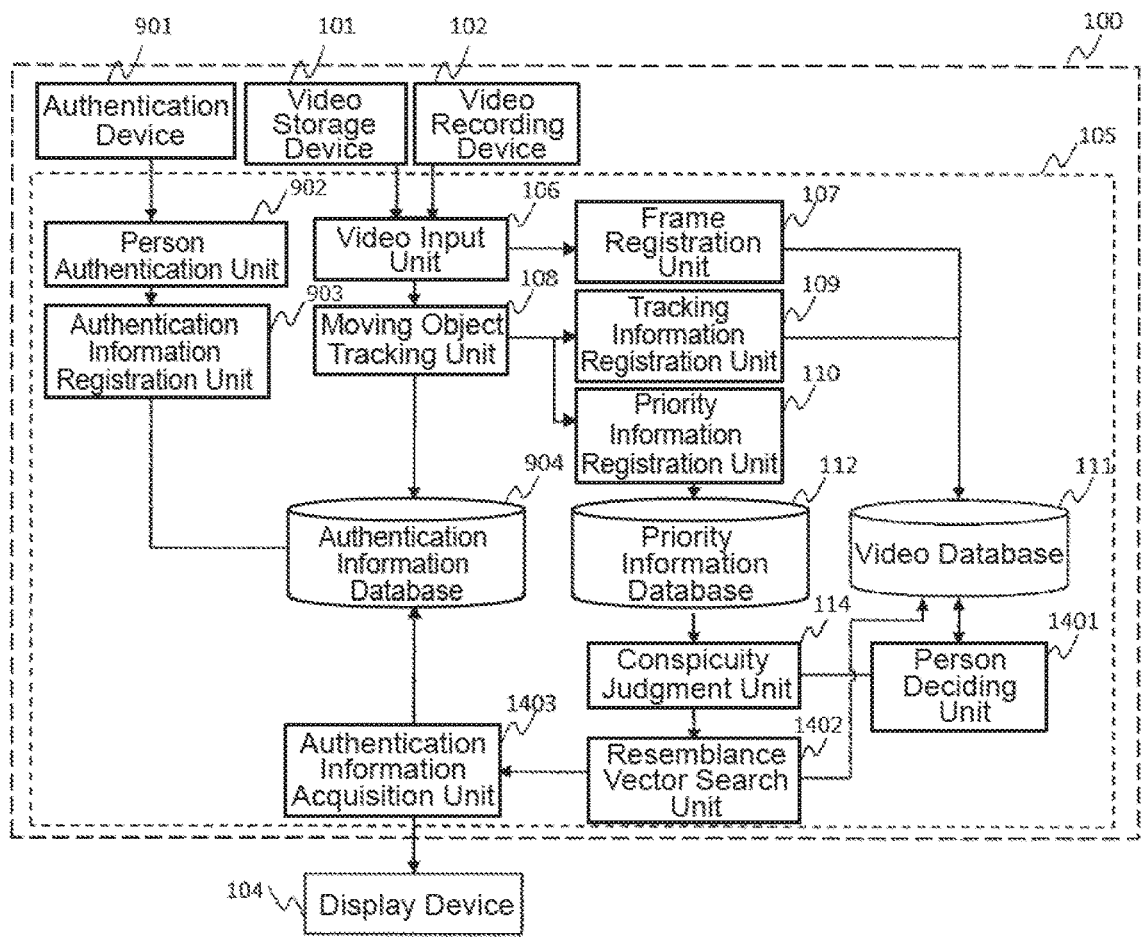
FIG. 14 is a block diagram illustrating a system configuration of a third embodiment.

FIG. 14 is an overall configuration diagram of the image search system 100 according to Embodiment 3 of the present invention. The image search system 100 according to this embodiment includes the video storage device 101, the video recording device 102, the input device 103, the display device 104, the server computer 105, and the authentication device 901. The video storage device 101, the video recording device 102, the input device 103, the display device 104, and the authentication device 901 are the same as those of Embodiment 1 and Embodiment 2, so that an explanation regarding them has been omitted.

The server computer 105 according to Embodiment 3 includes a person deciding unit 1401, a similar vector search unit 1402, and an authentication information acquisition unit 1403 in addition to the video input unit 106, the frame registration unit 107, the moving object tracking unit 108, the tracking information registration unit 109, the priority information registration unit 110, the video database 111, the priority information database 112, the conspicuity judgment unit 114, the authentication device 901, the person authentication unit 902, the authentication information registration unit 903, and the authentication information database 904 which are the same as those of Embodiment 2.

Figure 15:
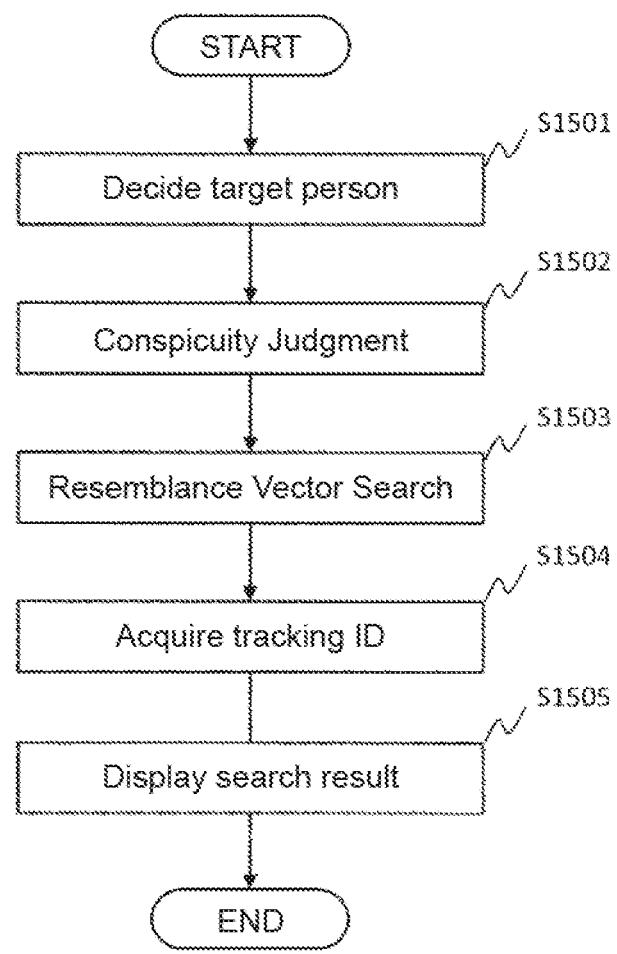
FIG. 15 is a flowchart illustrating display processing according to the third embodiment.

Authentication information registration processing and video registration processing of Embodiment 3 are the same as those of Embodiment 2. FIG. 15 is a flowchart for explaining processing for the server computer 105 according to Embodiment 3 of the present invention to display the authentication information. Each step of FIG. 15 will be explained below.

Firstly, the system decides a person(s) whose authentication information is to be displayed (step S1501). All persons displayed on the display device 104 can be decided as targets or a target person(s) can be decided in accordance with preset standards. For example, the target person(s) may be a person(s) who exist in a designated area or a person(s) who stays for a certain amount of time or longer.

Next, the same processing as that of step S702 to step S703 in FIG. 7 is executed to judge conspicuity (step S1502).

Then, a similar vector search with the patch image feature 334 in the video database 111 is performed by using the image feature extracted from conspicuous areas (step S1503). Under this circumstance, targets of the similar vector search are only videos which are video-recorded by the video recording device 102 equipped with the authentication device 901.

Subsequently, the tracking ID 312 is acquired from the video database 111 by using the results of the similar vector search. The tracking ID linked to the search result of the highest similarity may be acquired or the tracking ID of a person who appears most among highly ranked searched persons in the search results.

Lastly, an inquiry is made to the authentication information database 904 by using the tracking ID 312, the person ID 1101 or the person name 1102 is acquired and displayed together with videos on the display device 104.

According to Embodiment 3 of the present invention described above, the system can automatically assign the person ID or the person name to a person(s) in the videos and display them.

REFERENCE SIGNS LIST 100 image search system
101 video storage device
102 video recording device
103 input device
104 display device
105 server computer
106 video input unit
107 frame registration unit
108 moving object tracking unit
109 tracking information registration unit
110 priority information registration unit
111 video database
112 priority information database
113 moving object designating unit
114 conspicuity judgment unit
115 similar vector search unit
201 processor
202 storage device
203 processing program
204 network interface device
300 video data management information
310 moving object management information
320 tracking information management information
330 patch image feature management information
400 priority information
801 moving object selection area
802 conspicuity display area
803 search button
804 search result display area
901 authentication device
902 person authentication unit
903 authentication information registration unit
904 authentication information database
905 person designating unit
906 moving object deciding unit
1001 storage device
1002 processing program
1100 authentication data management information
1401 person deciding unit
1402 similar vector search unit
1403 authentication information acquisition unit

The invention claimed is:

1. An image search apparatus comprising:
an accumulation unit that accumulates search target images;
an area detector that learns search priority by analyzing first information extracted from a plurality of first areas included in a plurality of the search target images, analyzes second information extracted from a plurality of second areas included in a query image, and detects the second areas, the search priority of which is high, as conspicuous areas by using the second information; and
an image search unit that searches for the search target images by using an image feature extracted from the conspicuous areas;
wherein the area detector analyzes a plurality of pieces of the first information, learns the first information with lowest appearance frequency as conspicuity information the search priority of which is the highest, and detects the conspicuous areas on the basis of a distance between the second information and the conspicuity information.

2. The image search apparatus according to claim 1, further comprising a moving object judgment unit that determines that the moving object is captured in the first areas through a plurality of frames when similarity with the first areas in an immediately preceding frame or an immediately following frame from among the first areas is higher than a threshold value,
  wherein the accumulation unit further accumulates moving object identification information indicating the moving object with respect to the plurality of first areas.

3. The image search apparatus according to claim 1,
  wherein the accumulation unit accumulates the search target images for each camera which captures the search target images; and
  wherein the area detector learns the search priority with respect to each camera.

4. An image search system comprising an image search apparatus and an authentication device,
  wherein the image search apparatus includes:
  an accumulation unit that accumulates search target images and moving object identification information indicative of a moving object;
  an area detector that learns search priority by analyzing first information extracted from a plurality of first areas included in a plurality of the search target images, analyzes second information extracted from a plurality of second areas included in a query image, and detects the second areas, the search priority of which is high, as conspicuous areas by using the second information;
  an image search unit that searches for the search target images by using an image feature extracted from the conspicuous areas; and
  a moving object judgment unit that determines that the moving object is captured in the first areas through a plurality of frames when similarity with the first areas in an immediately preceding frame or an immediately following frame from among the first areas is higher than a threshold value;
  wherein the authentication device includes:
  a registration information storage unit that stores registration information of a plurality of users;
  a check unit that checks newly acquired user information against the registration information;
  an output unit that outputs first registration information, which is the registration information judged by the check unit that it matches the user information, to the image search apparatus; and
  wherein the accumulation unit further associates the first registration information with the moving object identification information and accumulates them.

5. An image search method comprising:
  a first step of accumulating search target images in an accumulation unit;
  a second step of learning search priority by analyzing first information extracted from a plurality of first areas included in a plurality of the search target images, analyzing second information extracted from a plurality of second areas included in a query image, and detecting the second areas, the search priority of which is high, as conspicuous areas by using the second information; and
  a third step of searching for the search target images by using an image feature extracted from the conspicuous areas;
  wherein in the second step, a plurality of pieces of the first information is analyzed, the first information with lowest appearance frequency is learned as conspicuity information the search priority of which is the highest, and the conspicuous areas are detected on the basis of a distance between the second information and the conspicuity information.

6. The image search method according to claim 5, further comprising a fourth step of judging that the moving object is captured in the first areas through a plurality of frames when similarity with the first areas in an immediately preceding frame or an immediately following frame from among the first areas is higher than a threshold value,
  wherein in the first step, moving object identification information indicating the moving object with respect to the plurality of first areas is further accumulated in the accumulation unit.

7. The image search method according to claim 6, further comprising:
  a fifth step of storing registration information of a plurality of users;
  a sixth step of acquiring the user information and checking the user information against the registration information; and
  a seventh step of outputting first registration information judged by the check unit that it matches the user information,
  wherein in the first step, the first registration information and the moving object identification information are associated with each other and accumulated.

8. The image search method according to claim 5,
  wherein in the first step, the search target images are accumulated for each camera which captures the search target images; and
  wherein in the second step, the search priority is learned with respect to each camera.

* * * * *